US008588085B2

(12) United States Patent
Kang et al.

(10) Patent No.: US 8,588,085 B2
(45) Date of Patent: Nov. 19, 2013

(54) METHOD AND APPARATUS FOR SUPPORTING IDLE MODE OF MOBILE STATION IN WIRELESS COMMUNICATION SYSTEM

(75) Inventors: Hyun-Jeong Kang, Seoul (KR);
Yeong-Moon Son, Yongin-si (KR);
Jung-Je Son, Yongin-si (KR);
Jung-Hoon Cheon, Suwon-si (KR);
Chan-Ho Min, Seoul (KR); Won-Il Roh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 994 days.

(21) Appl. No.: 12/478,649

(22) Filed: Jun. 4, 2009

(65) Prior Publication Data
US 2009/0303953 A1 Dec. 10, 2009

(30) Foreign Application Priority Data

| Jun. 4, 2008 | (KR) | 10-2008-0052747 |
| Jun. 18, 2008 | (KR) | 10-2008-0057431 |
| Nov. 28, 2008 | (KR) | 10-2008-0119523 |
| Apr. 8, 2009 | (KR) | 10-2009-0030501 |
| Jun. 3, 2009 | (KR) | 10-2009-0049033 |

(51) Int. Cl.
*H04W 4/00* (2009.01)

(52) U.S. Cl.
USPC .......................... 370/252; 370/329; 455/458

(58) Field of Classification Search
None
See application file for complete search history.

(56) References Cited

U.S. PATENT DOCUMENTS

| 7,636,577 | B2 * | 12/2009 | Mohanty et al. | 455/458 |
| 8,040,830 | B2 * | 10/2011 | Son et al. | 370/315 |
| 2004/0071113 | A1 | 4/2004 | Tiedemann, Jr. | |
| 2006/0160558 | A1 * | 7/2006 | Kim et al. | 455/522 |
| 2007/0243910 | A1 | 10/2007 | Ryu et al. | |
| 2007/0254686 | A1 * | 11/2007 | Wang et al. | 455/517 |
| 2008/0084941 | A1 | 4/2008 | Mohanty et al. | |
| 2008/0123577 | A1 | 5/2008 | Jakkola et al. | |
| 2011/0032899 | A1 * | 2/2011 | Park et al. | 370/329 |
| 2011/0065467 | A1 * | 3/2011 | Park et al. | 455/507 |
| 2011/0134893 | A1 * | 6/2011 | Park et al. | 370/336 |

FOREIGN PATENT DOCUMENTS

| CN | 101080036 A | 11/2007 |
| CN | 101138266 A | 3/2008 |
| EP | 2 026 819 A1 | 2/2009 |
| EP | 2 536 173 A1 | 12/2012 |
| RU | 2 185 028 C2 | 7/2002 |

(Continued)

OTHER PUBLICATIONS

Ahmadi, S. and Mohanty S., Proposal for IEEE 802.16 m, Superframe Header Design, IEEE 802.16 Broadband Wireless Access Working Group IEEE C802.16m-08/489, May 5, 2008.

(Continued)

*Primary Examiner* — Min Jung
(74) *Attorney, Agent, or Firm* — Jefferson IP Law, LLP

(57) ABSTRACT

A method and apparatus for supporting an idle mode of a Mobile Station (MS) in a superframe-based wireless communication system are provided. In a method for operating an MS to support an idle mode in a superframe-based wireless communication system, a paging listening interval is determined based on a Broadcast CHannel (BCH) information Transmit (TX) interval. BCH information including paging information is received during the paging listening interval. The inclusion/non-inclusion of a paging advertisement (MOB_PAG-ADV) message is detected based on the BCH information.

28 Claims, 7 Drawing Sheets

(56) References Cited

FOREIGN PATENT DOCUMENTS

| | | |
|---|---|---|
| WO | 2006/011775 A2 | 2/2006 |
| WO | 2006/030290 A2 | 3/2006 |
| WO | 2008/045502 A2 | 4/2008 |
| WO | 2008/153343 A1 | 12/2008 |

OTHER PUBLICATIONS

Mohanty S. et al., Proposal for IEEE 802.16 m, Quick Paging Channel Design, IEEE 802.16 Broadband Wireless Access Working Group IEEE C802.16m-08/663, Jun. 3, 2008.

* cited by examiner

METHOD AND APPARATUS FOR SUPPORTING IDLE MODE OF MOBILE STATION IN WIRELESS COMMUNICATION SYSTEM

PRIORITY

This application claims the benefit under 35 U.S.C. §119(a) of a Korean patent application filed in the Korean Intellectual Property Office on Jun. 4, 2008 and assigned Serial No. 10-2008-0052747, a Korean patent application filed in the Korean Intellectual Property Office on Jun. 18, 2008 and assigned Serial No. 10-2008-0057431, a Korean patent application filed in the Korean Intellectual Property Office on Nov. 28, 2008 and assigned Serial No. 10-2008-0119523, a Korean patent application filed in the Korean Intellectual Property Office on Apr. 8, 2009 and assigned Serial No. 10-2009-0030501 and a Korean patent application filed in the Korean Intellectual Property Office on Jun. 3, 2009 and assigned Serial No. 10-2009-0049033, the entire disclosures of each of which are hereby incorporated by reference.

BACKGROUND OF THE INVENTION

1. Field of the Invention

The present invention relates to a wireless communication system. More particularly, the present invention relates to methods for determining parameters for an idle mode in a wireless communication system, and Base Station (BS)/Mobile Station (MS) apparatuses and operation methods for paging in an idle mode in a wireless communication system.

2. Description of the Related Art

Research is being conducted to provide various services with a data rate of about 100 Mbps in an advanced $4^{th}$ Generation (4G) communication system. The 4G communication system is evolving to support mobility, high data rates, and a high Quality of Service (QoS) in Broadband Wireless Access (BWA) systems such as a Local Area Network (LAN) system and a Metropolitan Area Network (MAN) system. Typical examples of the above system employ the Institute of Electrical and Electronics Engineers (IEEE) 802.16 standards.

According to the IEEE 802.16 standards, if there is no Transmit/Receive (TX/RX) traffic for a certain amount of time, a Mobile Station (MS) operates in an idle mode to minimize power consumption. That is, if there is no TX/RX traffic for a certain amount of time, the MS transmits a DeREGistration REQuest (DREG-REQ) message to a serving Base Station (BS) in order to operate in an idle mode. Upon receiving the DREG-REQ message, the serving BS transmits a DeREGistration CoMmanD (DREG-CMD) message to the MS in order to allow the MS to transition to an idle mode. A description of the details of the DREG-REQ/CMD messages, which are not directly related to the present invention, will be omitted for conciseness.

The DREG-CMD message includes a paging information Type/Length/Value (TLV) field. The paging information TLV field includes a paging group identifier, a paging cycle parameter, and a paging offset parameter.

The paging group identifier is used to identify a paging group including a plurality of cells. The paging cycle parameter is determined according to a paging cycle request made by the MS. The paging offset parameter is used to determine the time to page the specific MS by using a frame number and the paging cycle parameter.

An idle-mode operation process is defined in the IEEE 802.16e standard. The idle-mode operation process defined in the IEEE 802.16e standard is also applicable to a system employing the IEEE 802.16m standard, which is an evolved version of the IEEE 802.16e standard. Hereafter, systems employing the IEEE 802.16e standard and the IEEE 802.16m standard will be referred to as an IEEE 802.16e system and IEEE 802.16m system, respectively. However, unlike the IEEE 802.16e system performing a frame-based operation, the IEEE 802.16m system performs a superframe (including several frames)-based operation and transmits system Broadcast CHannel (BCH) information on a superframe basis. Thus, the IEEE 802.16m system requires an idle-mode operation based on the superframe.

In addition, because paging group identifier information is included in a paging advertisement message (i.e. a MOB_PAG-ADV message) of the IEEE 802.16e system, even if there is no target to page and no need to transmit the MOB_PAG-ADV message in a paging listening interval, the IEEE 802.16e system always transmits the MOB_PAG-ADV message in the paging listening interval in order to notify the paging group identifier information to the corresponding MSs. Because the MOB_PAG-ADV message is robustly encoded prior to transmission, the transmission of the MOB_PAG-ADV message for notification of the paging group identifier may cause an overhead. Thus, the paging group identifier information needs to be separated from the MOB_PAG-ADV message.

SUMMARY OF THE INVENTION

An aspect of the present invention is to address at least the above-mentioned problems and/or disadvantages and to provide at least the advantages described below. Accordingly, an aspect of the present invention is to provide a method and apparatus for supporting an idle-mode operation of a Mobile Station (MS) in a wireless communication system such as the superframe-based system that is based on the Institute of Electrical and Electronics Engineers (IEEE) 802.16m standard.

Another aspect of the present invention is to provide a method and apparatus for reducing the paging overhead and minimizing the power consumption of an idle-mode MS in a wireless communication system.

In accordance with an aspect of the present invention, a method for operating a Mobile Station (MS) to support an idle mode in a superframe-based wireless communication system is provided. The method includes determining a paging listening interval based on a Broadcast CHannel (BCH) information Transmit (TX) interval, receiving BCH information including paging information during the paging listening interval, and detecting the inclusion/non-inclusion of a paging advertisement (MOB_PAG-ADV) message based on the BCH information.

In accordance with another aspect of the present invention, a method for operating a Base Station (BS) to support an idle mode in a superframe-based wireless communication system is provided. The method includes determining the need to transmit an MOB_PAG-ADV message to an MS, transmitting BCH information, indicating the transmission/non-transmission of the MOB_PAG-ADV message, through at least one or more first frames in a paging listening interval determined based on a BCH information TX interval, and transmitting the MOB_PAG-ADV message through at least one or more second frames in the paging listening interval.

In accordance with a further aspect of the present invention, a method for operating an MS to process additional system information and a neighbor BS advertisement message in an idle mode in a wireless communication system is provided. The method includes entering a paging listening interval to receive a system information indicator message, determining, based on the system information indicator message, whether the additional system information and the neighbor BS advertisement message are changed, and detecting the TX point of the additional system information and the neighbor BS advertisement message to receive the additional system information and the neighbor BS advertisement message at the detected TX point.

In accordance with yet another aspect of the present invention, a method for operating an MS to process additional system information and a neighbor BS advertisement message in an idle mode in a wireless communication system is provided. The method includes entering a paging listening interval and receiving a BCH to determine whether a system information indicator message exists, receiving the system information indicator message if the system information indicator message exists, determining, based on the system information indicator message, whether the additional system information and the neighbor BS advertisement message are changed, and detecting the TX point of the additional system information and the neighbor BS advertisement message to receive the additional system information and the neighbor BS advertisement message at the detected TX point, if the additional system information and the neighbor BS advertisement message are changed.

In accordance with still another aspect of the present invention, a method for receiving paging information in a wireless communication system is provided. The method includes decoding, if at least one or more frames for paging transmission in a superframe constituted by a plurality of frames is predefined, MAP information in the frame for the paging transmission, and detecting the location of paging information in the frame for the paging transmission by using MAP information for the paging information.

In accordance with still another aspect of the present invention, a method for receiving paging information in a wireless communication system is provided. The method includes detecting, if a start location for transmission of a paging message in a superframe constituted by a plurality of frames is determined, the message type information and the burst size information of the paging message, and decoding the paging message at the start location for transmission of the paging message by using by the message type information and the burst size information of the paging message.

In accordance with still another aspect of the present invention, an apparatus of an MS for supporting an idle mode in a superframe-based wireless communication system is provided. The apparatus includes an idle mode controller for determining a paging listening interval based on a BCH information TX interval, and a paging controller for receiving BCH information including paging information during the paging listening interval, and for detecting the inclusion/non-inclusion of an MOB_PAG-ADV message based on the BCH information.

In accordance with yet another aspect of the present invention, an apparatus of a BS for supporting an idle mode in a superframe-based wireless communication system is provided. The apparatus includes a controller for determining the need to transmit an MOB_PAG-ADV message to an MS, transmitting BCH information, indicating the transmission/non-transmission of the MOB_PAG-ADV message, through at least one or more first frames in a paging listening interval determined based on a BCH information TX interval, and transmitting the MOB_PAG-ADV message through at least one or more second frames in the paging listening interval.

In accordance with yet another aspect of the present invention, an apparatus of an MS for processing additional system information and a neighbor BS advertisement message in an idle mode in a wireless communication system is provided. The apparatus includes a controller for entering a paging listening interval to receive a system information indicator message, determining, based on the system information indicator message, whether the additional system information and the neighbor BS advertisement message are changed, and detecting the TX point of the additional system information and the neighbor BS advertisement message to receive the additional system information and the neighbor BS advertisement message at the detected TX point.

In accordance with still another aspect of the present invention, an apparatus of an MS for processing additional system information and a neighbor BS advertisement message in an idle mode in a wireless communication system is provided. The apparatus includes a controller for entering a paging listening interval and receiving a BCH to determine whether a system information indicator message exists, receiving the system information indicator message if the system information indicator message exists, determining, based on the system information indicator message, whether the additional system information and the neighbor BS advertisement message are changed, and detecting the TX point of the additional system information and the neighbor BS advertisement message to receive the additional system information and the neighbor BS advertisement message at the detected TX point, if the additional system information and the neighbor BS advertisement message are changed.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages certain exemplary embodiments of the present invention will be more apparent from the following description when taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention provides methods and apparatuses for supporting an idle mode of a Mobile Station (MS) and reducing a paging overhead in superframe-based wireless communication systems (e.g., a system based on the Institute of Electrical and Electronics Engineers (IEEE) 802.16m standard). Accordingly, exemplary embodiments of the present invention define a paging cycle, a paging offset, and a paging listening interval for a paging operation of an idle-mode MS; and propose an operation of the MS for receiving a paging group identifier, a paging indicator, and a Primary Broadcast CHannel (P-BCH) Configuration Change Count (CCC) in a superframe corresponding to the paging listening interval. Hereafter, systems employing the IEEE 802.16e standard and the IEEE 802.16m standard will be referred to as an IEEE 802.16e system and IEEE 802.16m system, respectively.

Figure 1:
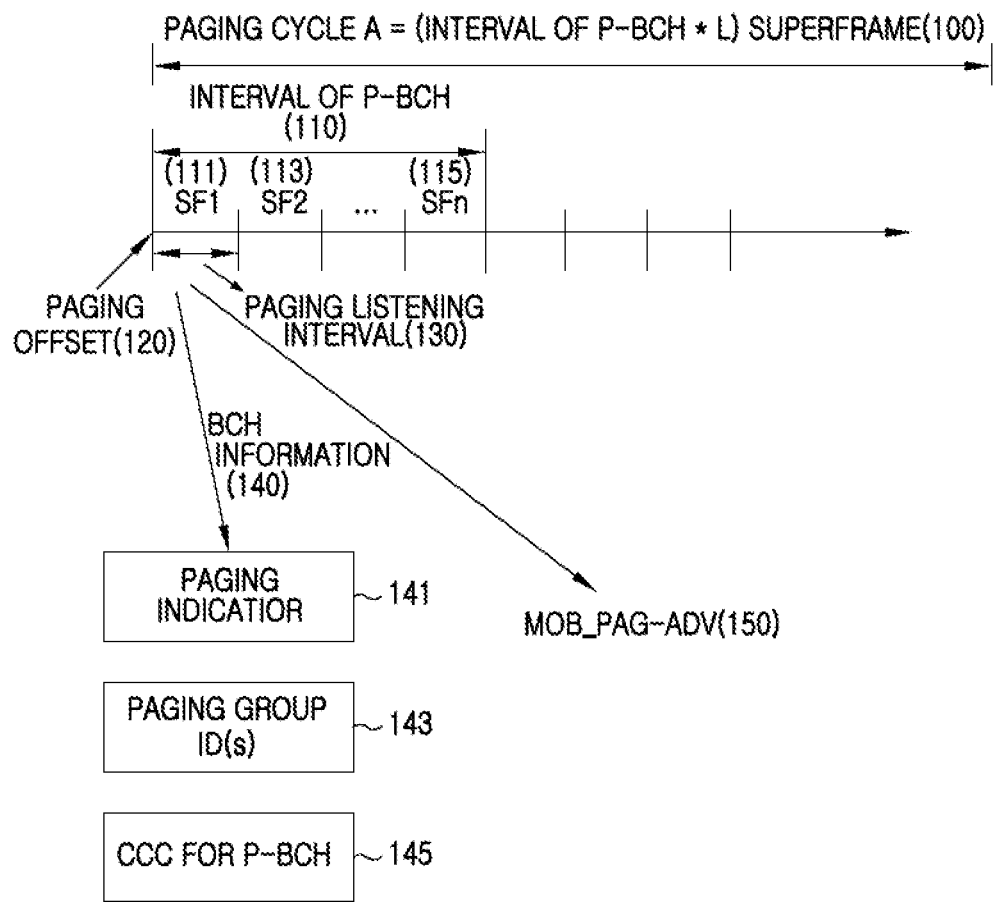
FIG. 1 is a diagram illustrating the use of paging-related parameter information according to an exemplary embodiment of the present invention.

FIG. 1 is a diagram illustrating the use of paging-related parameter information according to an exemplary embodiment of the present invention.

Referring to FIG. 1, the paging-related parameter information includes a paging cycle 100, a paging offset 120, and a paging listening interval 130. The paging cycle 100 has a length of a superframe corresponding to an integer multiple 'L' of a P-BCH information Transmit (TX) interval (Interval of P-BCH) 110. Herein, the P-BCH information TX interval 110 corresponds to the amount of time it takes for an MS to receive the P-BCH information among the information used to perform a communication service in the system. As illustrated in FIG. 1, the P-BCH information TX interval 110 is formed with 'n' superframes SF1 (111), SF2 (113), . . . , SFn (115). Thus, the P-BCH information is divided and transmitted in one or more superframes. Therefore, it takes the amount of time corresponding to the P-BCH information TX interval 110 for the MS to receive the P-BCH information. The paging offset 120 is the waiting time of the MS until the starting point of the paging listening interval 130 in the paging cycle 100. The paging offset 120 is set to have substantially the same length as the P-BCH information TX interval 110. The length of the paging offset 120 and the paging cycle 110 are set based on the P-BCH information TX interval 110, thereby making it possible to minimize the amount of time the MS, unaware of the P-BCH information, has to wait to receive the P-BCH information. That is, if the MS is unaware of the P-BCH information, it should separately receive the P-BCH information in order to access the system. Therefore, if the MS awakes during the P-BCH information TX interval 110, it may have to wait until the starting point of the next P-BCH information TX interval in order to receive the P-BCH information. Thus, the awaking point of the MS, i.e. the paging offset 120, is set to the starting point of the P-BCH information TX interval 110, thereby making it possible to minimize the wait time even when the MS should separately receive the P-BCH information.

According to another exemplary embodiment, the paging offset 120 may be set to have ½, ⅓ or ¼ of the length of the P-BCH information TX interval 110. In addition, the value of the paging offset 120 may be obtained through DeREGistration (DREG)–REQest (REQ)/CoMmanD (CMD) messages that the MS exchanges with a Base Station (BS) in order to enter an idle mode.

The paging listening interval 130 may exist in one or more superframes, and may have a length of one or more frames. In the paging listening interval 130, the MS may receive a paging advertisement message (i.e. a MOB_PAG-ADV message 150) from the BS, and the MOB_PAG-ADV message 150 may be used to indicate a location update process or a network entry process of the MS. In addition, Broadcast CHannel (BCH) information 140 transmitted in the superframe corresponding to the paging listening interval 130 may include: a paging indicator 141 indicating the existence/nonexistence of the MOB_PAG-ADV message 150 in the paging listening interval 130; a paging group IDentifier (ID) 143 indicating paging group information; and a CCC for P-BCH (CCC FOR P-BCH) 145 indicating a change in the P-BCH information 140. The BCH information 140 including the paging indicator 141, the paging group ID 143 and the CCC FOR P-BCH 145 may be Secondary Broadcast CHannel (S-BCH) information transmitted in each superframe, additional BCH information or P-BCH information transmitted over one or more superframes.

Herein, the paging indicator 141 is represented by 1 bit, and indicates whether at least one MOB_PAG-ADV message is transmitted in the paging listening interval 130. That is, if the bit value of the paging indicator 141 is '0', it indicates that an MOB_PAG-ADV message is not transmitted in the paging listening interval 130; if '1', it indicates that an MOB_PAG-ADV message is transmitted in the paging listening interval 130 at least once. In other words, the paging indicator 141 is used to indicate the existence/nonexistence of the MOB_PAG-ADV message in the paging listening interval 130. The paging indicator 141 may also be used to indicate the length of the paging listening interval 130. In this case, the paging indicator 141 may be represented by 3 bits. Herein, the first of the three bits may be used to indicate the existence/ nonexistence of the MOB_PAG-ADV message in the paging listening interval 130, and the other two bits may be used to indicate the length of the paging listening interval 130. For example, if the first bit of the paging indicator 141 is '0', it indicates the nonexistence of the MOB_PAG-ADV message in the paging listening interval 130, and the other two bits should be set to '00'. If the first bit of the paging indicator 141 is '1', it indicates the existence of the MOB_PAG-ADV message in the paging listening interval 130, and the other two bits may indicate the length of the paging listening interval 130. For example, if the first bit of the paging indicator 141 is '1' and the other two bits are '00', it indicates that the paging listening interval 130 has a length of 1 frame; if the first bit of the paging indicator 141 is '1' and the other two bits are '10', it indicates that the paging listening interval 130 has a length of 3 frames.

The paging group ID 143 indicates information of a paging group managed by the BS. The MS may receive the paging group ID 143 to determine whether it has changed paging groups. When transiting to an idle mode, the MS detects the MS-including paging group ID through a DREG-CMD message received from the BS. If the paging group ID 143 received by the MS in the paging listening interval 130 is different from the paging group ID included in the DREG-CMD message, the MS should perform a location update to obtain paging-related information according to its current paging group.

Figure 3:
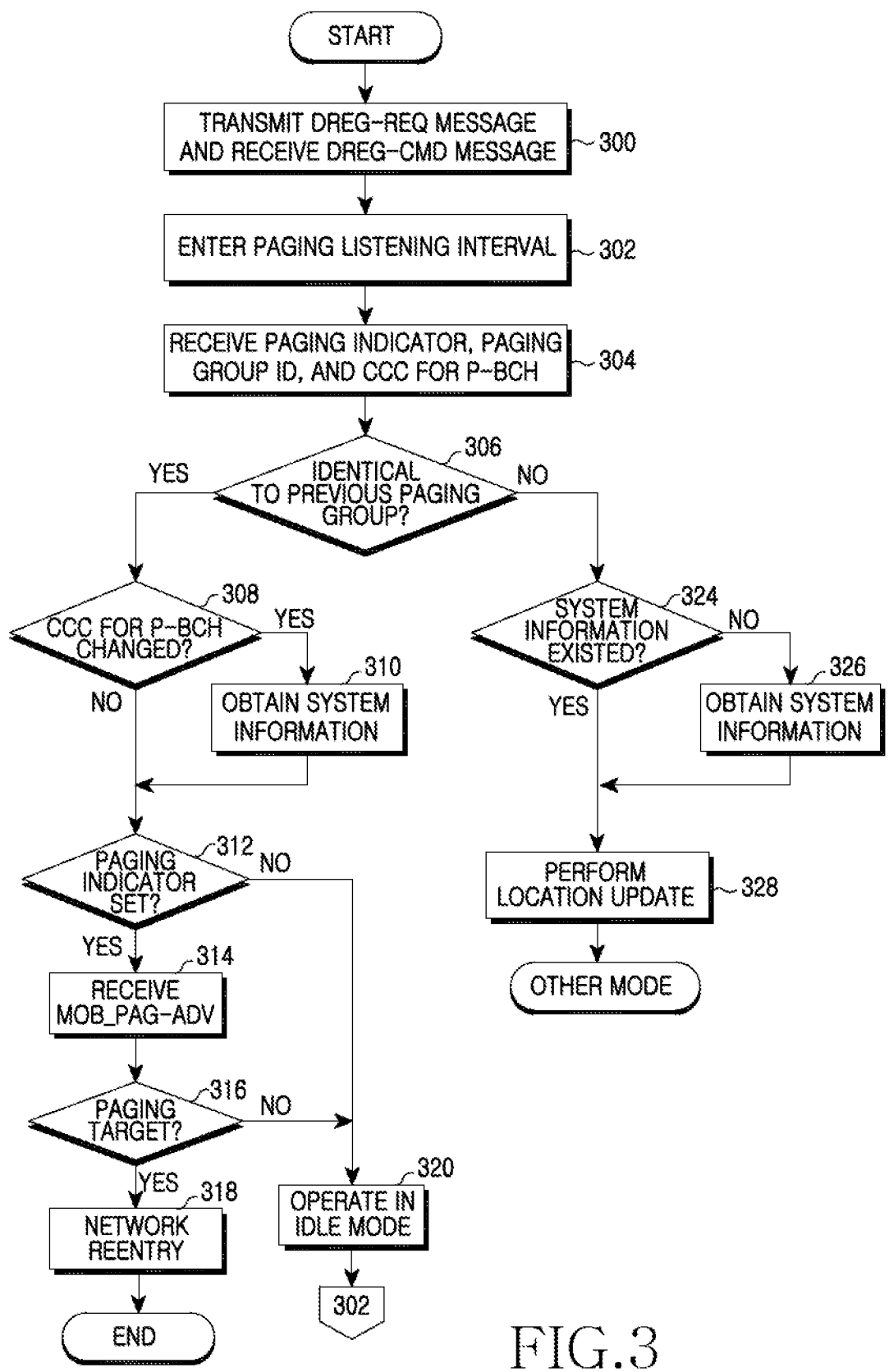
FIG. 3 is a flowchart illustrating an operation of a Mobile Station (MS) for paging in an idle mode in a wireless communication system according to an exemplary embodiment of the present invention.

Herein, the paging indicator and the paging group ID may be transmitted through a P-BCH transmitted over several superframes. In another exemplary embodiment, the paging indicator may be transmitted through an S-BCH transmitted in every superframe, and the paging group ID may be transmitted through an additional BCH not being an S-BCH or a P-BCH. If the paging indicator is transmitted through an S-BCH transmitted in every superframe, it is transmitted in every superframe regardless of the paging listening interval. An operation of the MS, according to an exemplary embodiment of the present invention, to process the paging indicator and the paging group ID in the paging listening interval is illustrated in FIG. 3. If the paging group ID is transmitted through an additional BCH in the paging listening interval, a paging control information BCH including the paging group ID may have a structure as shown in Table 1 or Table 2 below, according to an exemplary embodiment of the present invention.

TABLE 1

| Syntax | Size (bit) | Notes |
|---|---|---|
| Paging control information message( ) { | | |
| Management message type | 8 | Message type |
| While (data remains) { | | |
| Paging group ID | 16 | Paging group ID |
| } | | |
| } | | |

Referring to Table 1, the paging control information BCH includes message type information of a general control message. The message type information indicates that a control message includes paging control information. The paging control information BCH includes a paging group ID.

The paging control information BCH including the paging group ID may be transmitted in the form of a MAP Information Element (IE) as shown in Table 2, according to an exemplary embodiment of the present invention.

TABLE 2

| Syntax | Size (bits) | Notes |
|---|---|---|
| Paging control information IE( ) { | | |
| Type | 4 | Paging control information IE |
| Length | 4 | Length |
| While (data remains) { | | |
| Paging group ID | 16 | Paging group ID |
| } | | |
| } | | |

Referring to Table 2, the paging control information BCH includes type and length information that should be included in a general MAP IE. The type indicates that the MAP IE corresponds to paging control information, and the length information indicates the length information of the MAP IE. The type and length information field may vary depending on the structure of a MAP IE. The paging control information BCH includes a paging group ID.

The paging control information BCH with a structure as shown in Table 1 or Table 2 is transmitted using an idle-mode multicast ID or broadcast ID for an idle-mode MS. The paging control information is transmitted in the next subframe or the same subframe as a superframe header including a P-BCH or an S-BCH in a paging listening interval. Herein, it is assumed that a frame includes a plurality of subframes. Thus, if a superframe header including a P-BCH or an S-BCH is located in the $n^{th}$ subframe of the $m^{th}$ frame, the paging control information is transmitted through the $n^{th}$ or $(n+1)^{th}$ subframe of the $m^{th}$ frame. If the paging control information fails to be transmitted in the next subframe or the same subframe as a superframe header including a P-BCH or an S-BCH in a paging listening interval, it should be able to be transmitted in the same frame as the superframe header.

For a case where a paging indicator and a paging group ID is transmitted through an additional BCH that is not an S-BCH or a P-BCH, paging control information corresponding to the BCH including the paging indicator and the paging group ID will be described below.

The paging control information including the paging indicator and the paging group ID may be transmitted in the form of a MAP IE. Herein, the MAP IE is transmitted using an idle-mode multicast ID or broadcast ID for an idle-mode MS. A structure of a paging control information BCH transmitted in the form of a MAP IE is shown in Table 3 below, according to an exemplary embodiment of the present invention.

TABLE 3

| Syntax | Size (bits) | Notes |
|---|---|---|
| Paging control information IE( ) { | | |
| Type | 4 | Paging control information IE |
| Length | 4 | Length |
| While (data remains) { | | |
| Paging group ID | 15 | Paging group ID |
| Paging indicator | 1 | Paging indicator 0: no page for the paging group 1: page for the paging group |
| } | | |
| } | | |

Referring to Table 3, the paging control information BCH includes type and length information that should be included in a general MAP IE. The type indicates that the MAP IE corresponds to paging control information, and the length information indicates the length information of the MAP IE.

The type and length information field may vary depending on the structure of a MAP IE. The paging control information BCH includes a paging group ID and paging indicator information indicating whether an MOB_PAG-ADV message for an MS included in the paging group is transmitted in a paging listening interval.

The paging control information BCH with a structure of Table 3 is transmitted in the next subframe or the same subframe as a superframe header, which transmits a P-BCH or an S-BCH. Upon receiving the paging control information BCH with a structure of Table 3, the MS checks whether it includes its own paging group ID. If it includes its own paging group ID, the MS determines whether an MOB_PAG-ADV message is transmitted for the paging group from a paging indicator field. An operation of the MS, according to an exemplary embodiment of the present invention, to process the paging group ID and the paging indicator is illustrated in FIG. 3.

The paging control information BCH has a structure of a general control message. The paging control information BCH with a structure of a general control message is transmitted using an idle-mode multicast ID or broadcast ID for an idle-mode MS. The paging control information BCH with a structure of a general control message may have a structure as shown in Table 4 or Table 5 below, according to an exemplary embodiment of the present invention.

TABLE 4

| Syntax | Size (bits) | Notes |
|---|---|---|
| Paging control information message( ) { | | |
| Management message type | 8 | Message type |
| While (data remains) { | | |
| Paging group ID | 15 | Paging group ID |
| Paging indicator | 1 | Paging indicator |
| | | 0: no page for the paging group |
| | | 1: page for the paging group |
| } | | |
| } | | |

Referring to Table 4, the paging control information BCH includes message type information of a general control message. The message type information indicates that a control message includes paging control information. The paging control information BCH includes a paging group ID and a paging indicator indicating whether an MOB_PAG-ADV message for an MS included in the paging group is transmitted in a paging listening interval. An operation of the MS, according to an exemplary embodiment of the present invention, to process the paging group ID and the paging indicator is illustrated in FIG. 3.

If an MOB_PAG-ADV message is transmitted for the paging group, the paging control information BCH may contain information about the TX point of the MOB_PAG-ADV message. The paging control information BCH including information about the TX point of the MOB_PAG-ADV message has a structure as shown in Table 5 or Table 6 below, according to an exemplary embodiment of the present invention.

TABLE 5

| Syntax | Size (bit) | Notes |
|---|---|---|
| Paging control information message( ) { | | |
| Management message type | 8 | Message type |
| While (data remains) { | | |
| Paging group ID | 15 | Paging group ID |
| Paging indicator | 1 | Paging indicator |
| | | 0: no page for the paging group |
| | | 1: page for the paging group |
| } | | |
| If(Paging indicator==1) { | | |
| Paging message transmission time | 8 | The value indicates (value + the subframe with the Paging control information) subframe. |
| } | | |
| } | | |

Referring to Table 5, the paging control information BCH includes message type information of a general control message. The message type information indicates that a control message includes paging control information. The paging control information BCH includes a paging group ID and a paging indicator indicating whether an MOB_PAG-ADV message for an MS included in the paging group is transmitted in a paging listening interval. An operation of the MS, according to an exemplary embodiment of the present invention, to process the paging group ID and the paging indicator is illustrated in FIG. 3. The paging control information BCH also includes MOB_PAG-ADV message TX point information. The MOB_PAG-ADV message TX point information indicates the time from a subframe transmitting the paging control information BCH to a subframe transmitting an MOB_PAG-ADV message. Herein, an uplink subframe is excluded. For example, if an MOB_PAG-ADV message TX point field value is '0', it indicates that the MOB_PAG-ADV message is transmitted in the same subframe as the paging control information BCH; if the MOB_PAG-ADV message TX point field value is '1', it indicates that the MOB_PAG-ADV message is transmitted in the next subframe of the subframe transmitting the paging control information BCH. As another example, if one frame includes 5 downlink subframes and 3 uplink subframes, the paging control information BCH is received in the second subframe and the MOB_PAG-ADV message TX point field value is '4', it indicates that the MOB_PAG-ADV message is transmitted in the first subframe of the next frame. The MOB_PAG-ADV message TX point information makes it possible to minimize the information that the MS unnecessarily receives or processes from the RX point of the paging control information BCH to the RX point of the MOB_PAG-ADV message.

TABLE 6

| Syntax | Size (bit) | Notes |
|---|---|---|
| Paging control information message( ) { | | |
| While (data remains) { | | |
| Paging group ID | 15 | Paging group ID |
| Paging message transmission time | 8 | The value indicates (value + the subframe with the Paging control information) subframe. |
| } | | |
| } | | |

Referring to Table 6, the paging control information BCH includes a paging group ID and the MOB_PAG-ADV message TX point information of the corresponding paging group. The MOB_PAG-ADV message TX point information indicates the time from a subframe transmitting the paging control information BCH to a subframe transmitting an MOB_PAG-ADV message targeting MSs of the paging group in a paging listening interval. Herein, an uplink subframe is excluded. For example, if a paging group ID is '1' and an MOB_PAG-ADV message TX point field value is '0', it indicates that the MOB_PAG-ADV message including MSs of paging group '1' is transmitted in the same subframe as the paging control information BCH; if the paging group ID is '1' and the MOB_PAG-ADV message TX point field value is '1', it indicates that the MOB_PAG-ADV message including MSs of paging group '1' is transmitted in the next subframe of the subframe transmitting the paging control information BCH. If any MSs in a paging group is not a paging target in a paging listening interval, then the value of MOB_PAG-ADV message TX point field of the paging group should be set to the maximum value of the field (e.g., if a size of the field size is 8, then the maximum value becomes 255).

The paging control information with a structure as shown in Table 3, Table 4, Table 5 or Table 6 is transmitted in the next subframe or the same subframe as a superframe header including a P-BCH or an S-BCH in a paging listening interval. If the paging control information fails to be transmitted in the next subframe or the same subframe as a superframe header including a P-BCH or an S-BCH in a paging listening interval, it should be able to be transmitted in the same frame as the superframe header.

The CCC FOR P-BCH 145 is used to determine whether P-BCH information is changed. That is, whenever the P-BCH information is changed, a BS increases the CCC FOR P-BCH 145 by a factor or '1'. In addition, an MS awoken in the paging listening interval 130 detects that the P-BCH is changed, if the value of the CCC FOR P-BCH 145 is different from the CCC value stored in the MS. Upon detection of a change in the P-BCH, the MS may receive the changed P-BCH in the P-BCH information TX interval 110. Although it has been described that the CCC FOR P-BCH 145 is transmitted through the S-BCH transmitted in every superframe or the P-BCH transmitted over one or more superframes, the CCC FOR P-BCH 145 may be provided through additional BCH information or a BCH transmitted in every frame.

As described above, only some of the paging indicator, the paging group ID and the CCC value may be transmitted through different broadcast messages. In another exemplary embodiment, the paging indicator, the paging group ID and the CCC value may be transmitted through one broadcast message.

Figure 2:
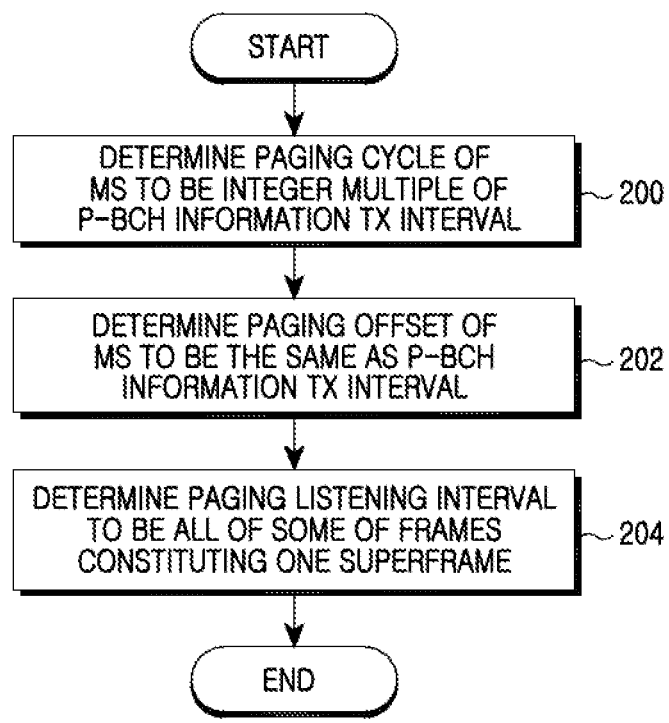
FIG. 2 is a flowchart illustrating an operation of a Base Station (BS) for determining parameters for an idle-mode operation in a wireless communication system according to an exemplary embodiment of the present invention.

FIG. 2 is a flowchart illustrating an operation of the BS for determining parameters for an idle-mode operation in a wireless communication system according to an exemplary embodiment of the present invention.

Referring to FIG. 2, in step 200, the BS determines the paging cycle 100 of an MS to be superframe corresponding to an integer multiple of the P-BCH information TX interval 110.

In step 202, the BS determines the paging offset 120 of the MS to be the same as the P-BCH information TX interval 110. The paging offset 120 is set to the starting point of the P-BCH information TX interval 110, thereby making it possible to minimize the waiting time even when the MS should separately receive the P-BCH information.

According to an exemplary embodiment of the preset invention, the paging offset 120 may be set at the starting or end point of each superframe. Also, the value of the paging offset 120 may be obtained through DREG-REQ/CMD messages that the MS exchanges with the BS in order to enter an idle mode.

In step 204, the BS determines the paging listening interval 130 to be all or some of the frames constituting one superframe. That is, the paging listening interval 130 exists in one superframe, and may have a length of one or more frames.

Thereafter, the BS ends the parameter determination process.

FIG. 3 is a flowchart illustrating an operation of the MS for paging in an idle mode in a wireless communication system according to an exemplary embodiment of the present invention.

Referring to FIG. 3, in step 300, the MS transmits a DREG-REQ message to a BS and receives a DREG-CMD message for the DREG-REQ message from the BS. The DREG-CMD message includes paging cycle and paging offset information. In the paging cycle, the MS waits for the paging offset and then has a predefined paging listening interval. The MS may receive an MOB_PAG-ADV message in the paging listening interval. In the paging listening interval, the MS acquires downlink synchronization with the BS and decodes the MOB_PAG-ADV message. The paging listening interval is substantially the same as that described above with reference to FIG. 1.

In step 302, according to the paging cycle and the paging offset information negotiated with the BS, the MS in an idle mode awakes to enter a paging listening interval.

In step 304, the MS receives a paging indicator, a paging group ID, and a CCC FOR P-BCH from BCH information transmitted in a superframe corresponding to the paging listening interval. In addition, if there is an MOB_PAG-ADV message, the MS receives the MOB_PAG-ADV in the paging listening interval of the paging cycle.

In step 306, from the paging group ID, the MS determines whether the current paging group of the MS is identical to the previous paging group. If the current paging group is identical to the previous paging group in step 306, the MS proceeds to step 308. In step 308, the MS determines whether the CCC FOR P-BCH is changed. If the CCC FOR P-BCH is changed, the MS proceeds to step 310. In step 310, the MS obtains P-BCH information. Herein, even if the CCC FOR P-BCH is changed, the MS may not obtain P-BCH information in step 310.

In step 312, the MS determines whether the paging indicator is set to indicate the existence of an MOB_PAG-ADV message. If the paging indicator is set to indicate the existence of an MOB_PAG-ADV message in step 312, the MS proceeds to step 314. In step 314, the MS detects the transmission of the MOB_PAG-ADV message in the paging listening interval and receives the MOB_PAG-ADV message.

In step 316, from the received MOB_PAG-ADV message, the MS determines whether it is a paging target. If it is a paging target in step 316, the MS proceeds to step 318. In step 318, the MS performs a network reentry process by using the information of the MOB_PAG-ADV message received in the paging listening interval. If it is not a paging target in step 316, the MS proceeds to step 320. In step 320, the MS transitions to an idle mode and continues to perform an idle-mode operation.

If the paging indicator is set to indicate the nonexistence of an MOB_PAG-ADV message in step 312, the MS proceeds to step 320. In step 320, the MS detects the non-transmission of an MOB_PAG-ADV message, transitions to an idle mode, and continues to perform an idle-mode operation.

If the current paging group ID is different from to the stored paging group ID of the MS in step 306, the MS proceeds to step 324. In step 324, the MS determines whether it has BCH information used for a location update operation. If it has the BCH information used for a location update in step 324, the MS proceeds to step 328. In step 328, the MS performs a location update operation.

If it does not have the BCH information used for a location update in step 324, the MS proceeds to step 326. In step 326, the MS obtains BCH information used for a location update operation. In step 328, the MS performs a location update operation. Descriptions of the conditions for the location update operation will be omitted since they would obscure the invention in unnecessary detail.

Thereafter, the MS ends the idle-mode paging operation.

The location update process or the network entry process of the MS includes: a code-based ranging operation between the MS and the BS, an operation of transmitting an RNG-REQ message from the MS to the BS; and an operation of transmitting an RNG-RSP message from the BS to the MS in response to the RNG-REQ message.

Figure 4:
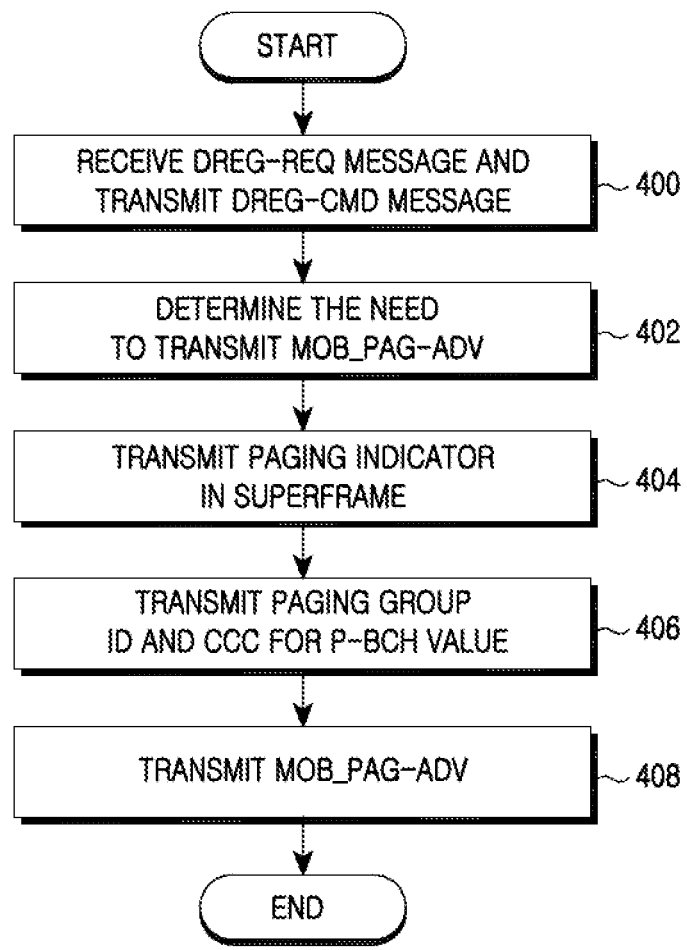
FIG. 4 is a flowchart illustrating an operation of the BS for paging in an idle mode in a wireless communication system according to an exemplary embodiment of the present invention.

FIG. 4 is a flowchart illustrating an operation of the BS for paging in an idle mode in a wireless communication system according to an exemplary embodiment of the present invention.

Referring to FIG. 4, in step 400, the BS receives a DREG-REQ message from an MS and transmits a DREG-CMD message to the MS in response to the DREG-REQ message.

In step 402, the BS determines the need to transmit an MOB_PAG-ADV message.

In step 404, the BS transmits a paging indicator indicating the transmission/non-transmission of the MOB_PAG-ADV message in a corresponding superframe. For example, if there is downlink data to be transmitted to the MS, the BS should transmit the MOB_PAG-ADV message to the MS; if there is no downlink data to be transmitted to the MS, the BS need not transmit the MOB_PAG-ADV message.

In step 406, the BS transmits a paging group ID and a CCC FOR P-BCH value through the BCH. In step 408, the BS transmits the MOB_PAG-ADV message.

Thereafter, the BS ends the idle-mode paging operation.

Figure 5:
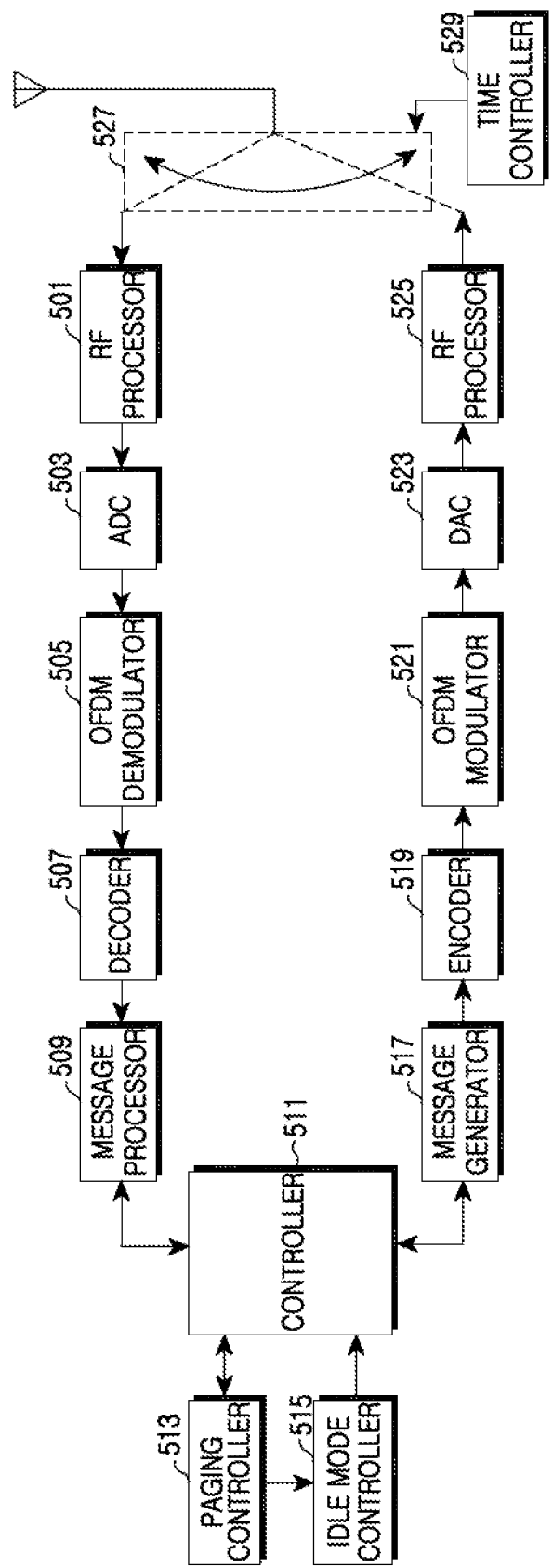
FIG. 5 is a block diagram of an apparatus for paging in an idle mode in a wireless communication system according to an exemplary embodiment of the present invention.

FIG. 5 is a block diagram of a BS or MS apparatus for paging in an idle mode in a wireless communication system according to an exemplary embodiment of the present invention.

Referring to FIG. 5, the MS (or BS) includes an RX Radio Frequency (RF) processor 501, an Analog-to-Digital Converter (ADC) 503, an Orthogonal Frequency Division Multiplexing (OFDM) demodulator 505, a decoder 507, a message processor 509, a controller 511, a paging controller 513, an idle mode controller 515, a message generator 517, an encoder 519, an OFDM modulator 521, a Digital-to-Analog Converter (DAC) 523, a TX RF processor 525, a Time Division Duplexing (TDD) switch 527, and a time controller 529.

The time controller 529 controls a switching operation of the TDD switch 527 based on frame synchronization. For example, in an RX period, the time controller 529 controls the TDD switch 527 so that an antenna is coupled to the RX RF processor 501. In a TX period, the time controller 529 controls the TDD switch 527 so that the antenna is coupled to the TX RF processor 525.

In the RX period, the RX RF processor 501 converts an RF signal received through the antenna into a baseband analog signal. The ADC 503 converts the analog signal received from the RX RF processor 501 into sample data. The OFDM demodulator 505 Fast Fourier Transform (FFT)-processes the sample data received from the ADC 503 to output frequency-domain data. The decoder 507 selects data of desired subcarriers from the frequency-domain data received from the OFDM demodulator 505, and demodulates/decodes the selected data in accordance with a predefined Modulation and Coding Scheme (MCS) level. The message processor 509 analyzes a control message received from the decoder 507 and provides the analysis results to the controller 511.

The controller 511 performs processing according to the information received from the message processor 509 and provides the processing results to the message generator 517.

The message generator 517 generates a message using various data received from the controller 511 and provides the generated message to the encoder 519 of a physical layer. The encoder 519 encodes and modulates data received from the message generator 517 in accordance with a predefined MCS level. The OFDM modulator 521 Inverse Fast Fourier Transform (IFFT)-processes data received from the encoder 519 to output sample data (OFDM symbols). The DAC 523 converts the sample data into an analog signal. The TX RF processor 525 converts the analog signal received from the DAC 523 into an RF signal and transmits the RF signal through the antenna.

In the case of the MS, if there is no TX data, the idle mode controller 515 transmits a DREG-REQ message to a BS and receives a DREG-CMD message for the DREG-REQ message from the BS to transition to an idle mode.

In addition, if an MOB_PAG-ADV message is not included in a corresponding superframe, the idle mode controller 515 transitions to an idle mode. If the MOB_PAG-ADV message is included in the corresponding superframe, the idle mode controller 515 detects whether the MS is a paging target. If the MS is a paging target, the idle mode controller 515 performs a network entry operation; if the MS is not a paging target, the idle mode controller 515 transitions to an idle mode. In the idle mode, the idle mode controller 515 obtains paging cycle information, paging offset information, and paging listening interval information.

In the idle mode, the paging controller 513 receives BCH information in a paging listening interval, and uses the received BCH information to determine whether system information obtainment is needed and whether an MOB_PAG-ADV message is included.

The paging controller 513 compares a first paging group ID obtained in the idle mode and a second paging group ID. If the first paging group ID is identical to the second paging group ID, the paging controller 513 detects a superframe-based CCC FOR P-BCH obtained through the BCH to determine whether the system information obtainment is needed.

In the case of the BS, the idle mode controller 515 transitions the corresponding MS into an idle mode. For example, the idle mode controller 515 receives a DREG-REQ message from the MS and transmits a DREG-CMD message to the MS in response to the DREG-REQ message. The controller 511 determines whether an MOB_PAG-ADV message should be transmitted to the idle-mode MS, and transmits BCH information including a paging indicator indicating the transmission/non-transmission of the MOB_PAG-ADV message.

A description will be given of an operation of the MS to process system information and a neighbor BS advertisement message in an idle mode in a wireless communication system according to an exemplary embodiment of the present invention.

The controller 511 enters a paging listening interval to receive system information of a P-BCH and an S-BCH and a broadcast system information indicator message. The broadcast system information indicator message, according to an exemplary embodiment of the present invention, has a format structure as shown in Table 6 below.

The controller 511 determines whether the CCC value of a neighbor BS advertisement message included in the broadcast system information indicator message is identical to the CCC value of a neighbor BS advertisement message stored in the MS. If they are different, the MS detects information about the point of transmission of a neighbor BS advertisement message by the BS, in order to obtain the latest neighbor BS advertisement message information. Thereafter, the controller 511 receives the neighbor BS advertisement message at the neighbor BS advertisement message TX point. If the neighbor BS advertisement message TX point is in the paging listening interval of the MS, the controller 511 receives the neighbor BS advertisement message and then transitions to a paging unavailable interval. If the neighbor BS advertisement message TX point is in the paging unavailable interval, the MS awakes from the paging unavailable interval to receive the neighbor BS advertisement message. Then, the MS again transitions to the paging unavailable interval.

If the TX point of an additional system control broadcast message corresponds to the paging unavailable interval of the MS, the MS awakes from the paging unavailable interval at the TX point of the additional system control broadcast message to receive the additional system control broadcast message. Then, the MS again transitions to the paging unavailable interval.

A description will be given of an operation of the MS to process system information and a neighbor BS advertisement message in an idle mode in a wireless communication system according to another exemplary embodiment of the present invention.

The controller 511 enters a paging listening interval to receive a superframe header for a P-BCH and an S-BCH transmitted by a BS. The S-BCH includes a broadcast system information indicator indicating whether the BS transmits a broadcast system information indicator message in the paging listening interval.

Based on the broadcast system information indicator, the controller 511 determines whether the broadcast system information indicator message is transmitted in the paging listening interval. If the broadcast system information indicator message is transmitted, the MS receives the broadcast system information indicator message.

In the configuration illustrated in FIG. 5, the controller 511 controls the message processor 509, the message generator 517, the paging controller 513, and the idle mode controller 515. However, the controller 511 may be configured to also perform any number of the functions of the message processor 509, the message generator 517, the paging controller 513, and the idle mode controller 515. Although separate units are provided for respective functions of the controller 511, the controller 511 may be configured to perform all or some of the functions on behalf of such separate units.

According to an exemplary embodiment of the present invention, the indicator indicating the inclusion/non-inclusion of the paging control information as shown in Tables 1 to 5, may be included in the S-BCH so that the MS in the paging listening interval detects the transmission of the paging control information in the paging listening interval. In addition, the paging control information may be transmitted at a predefined location.

Even if the MS is in an idle mode, the MS should receive not only system information transmitted through the P-BCH and the S-BCH, but also system information or a neighbor BS advertisement message transmitted through other BCHs. The system information or the neighbor BS advertisement message received through the respective BCHs may be transmitted while the MS is in the paging listening interval or the paging unavailable interval. The system information and the neighbor BS advertisement message are used by the MS to transition from an idle mode to a general communication mode. The use of the system information and the neighbor BS advertisement message makes it possible for the MS to rapidly transition from an idle mode to a general communication mode. Thus, the idle-mode MS should be able to monitor whether the system information and the neighbor BS advertisement message are changed, and should be able to receive the changed system information and the changed neighbor BS advertisement message while minimizing power consumption.

Hereinafter, a description will be given of a scheme for the idle-mode MS to determine whether it should receive the system information and the neighbor BS advertisement message, and to receive the information by detecting the information receiving point.

Figure 6:
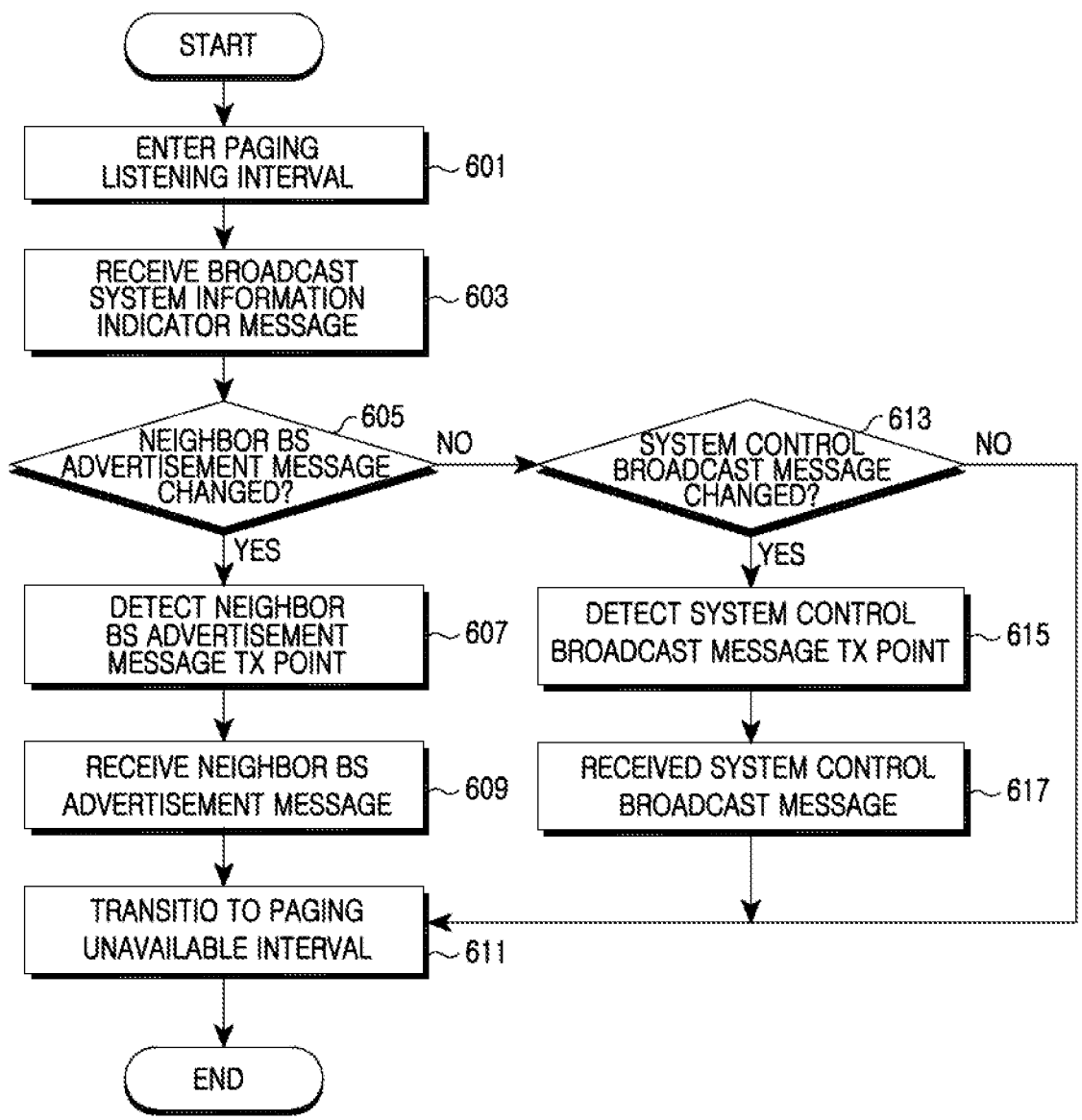
FIG. 6 is a flowchart illustrating an operation of the MS for processing system information and a neighbor BS advertisement message in an idle mode in a wireless communication system according to an exemplary embodiment of the present invention.

FIG. 6 is a flowchart illustrating an operation of the MS for processing system information and a neighbor BS advertisement message in an idle mode in a wireless communication system according to an exemplary embodiment of the present invention.

Referring to FIG. 6, in step 601, the MS enters a paging listening interval to receive system information of a P-BCH and an S-BCH. In step 603, the MS receives a broadcast system information indicator message. The broadcast system information indicator message, according to an exemplary embodiment of the present invention, has a format structure as shown in Table 7 below.

TABLE 7

| Syntax | Size (bit) | Notes |
|---|---|---|
| Broadcast system information indicator IE( ) { | | |
| Type | | Broadcast system information indicator IE |
| Length | | |
| CCC for additional broadcast message | 8 | The value of the configuration change count of the additional broadcast message |
| Additional broadcast message transmission time | 8 | The least significant bits of the frame number of the next additional broadcast message transmission |
| CCC for MOB_NBR-ADV | 8 | The value of the configuration change count of MOB_NBR-ADV |
| MOB_NBR-ADV transmission time | 8 | The least significant bits of the frame number of the next MOB_NBR-ADV transmission |
| } | | |

Referring to Table 7, the broadcast system information indicator message includes type and length information that should be included in a general MAP IE. The type indicates that the MAP IE corresponds to a broadcast system information indicator message, and the length information indicates the length information of the MAP IE. The type and length information field may vary depending on the structure of a MAP IE. The broadcast system information indicator message includes: a CCC value of an additional system control broadcast message transmitted by a BS; information about the point of transmission of the additional system control broadcast message by the BS; a CCC value of a neighbor BS advertisement message transmitted by the BS; and information of the point of transmission of the neighbor BS advertisement message by the BS. Herein, the additional system control broadcast message may correspond to Downlink Channel Descriptor (DCD) or Uplink Channel Description (UCD) information, and the neighbor BS advertisement message may correspond to an MOB_NBR-ADV message.

In step 605, the MS determines whether the CCC value of a neighbor BS advertisement message included in a broadcast system information indicator message as shown in Table 6 is identical to the CCC value of a neighbor BS advertisement message stored in the MS. If they are different, the MS proceeds to step 607. In step 607, the MS detects information about the point of transmission of a neighbor BS advertisement message by the BS, in order to obtain the latest neighbor BS advertisement message information.

In step 609, the MS receives the neighbor BS advertisement message at the neighbor BS advertisement message TX point.

In step 611, if the neighbor BS advertisement message TX point is in the paging listening interval of the MS, the MS receives the neighbor BS advertisement message and then transitions to a paging unavailable interval. If the neighbor BS advertisement message TX point is in a paging unavailable interval, the MS awakes from the paging unavailable interval to receive the neighbor BS advertisement message. Then, the MS again transitions to the paging unavailable interval.

If the neighbor BS advertisement message is not changed in step 605, the MS proceeds to step 613. In step 613, based on the CCC value of the additional system control broadcast message, the MS determines whether it is different from the additional system control broadcast information stored in the MS.

If the additional system control broadcast message is changed, the MS proceeds to step 615. In step 615, the MS detects the TX point of the additional system control broadcast message.

In step 617, the MS receives the updated additional system control broadcast message at the additional system control broadcast message TX point. Herein, if the additional system control broadcast message TX point corresponds to the paging listening interval of the MS, the MS receives the additional system control broadcast message and then transitions to a paging unavailable interval in step 611. If the additional system control broadcast message TX point corresponds to the paging unavailable interval of the MS, the MS awakes from the paging unavailable interval at the additional system control broadcast message TX point to receive the additional system control broadcast message. Thereafter, the MS again transitions to the paging unavailable interval.

According to the determinations in steps 605 and 613, if the MS already has a neighbor BS advertisement message and an additional system control broadcast message, the MS transitions to the paging unavailable interval of step 611.

Thereafter, the MS ends the processing operation for the system information and the neighbor BS advertisement message.

Figure 7:
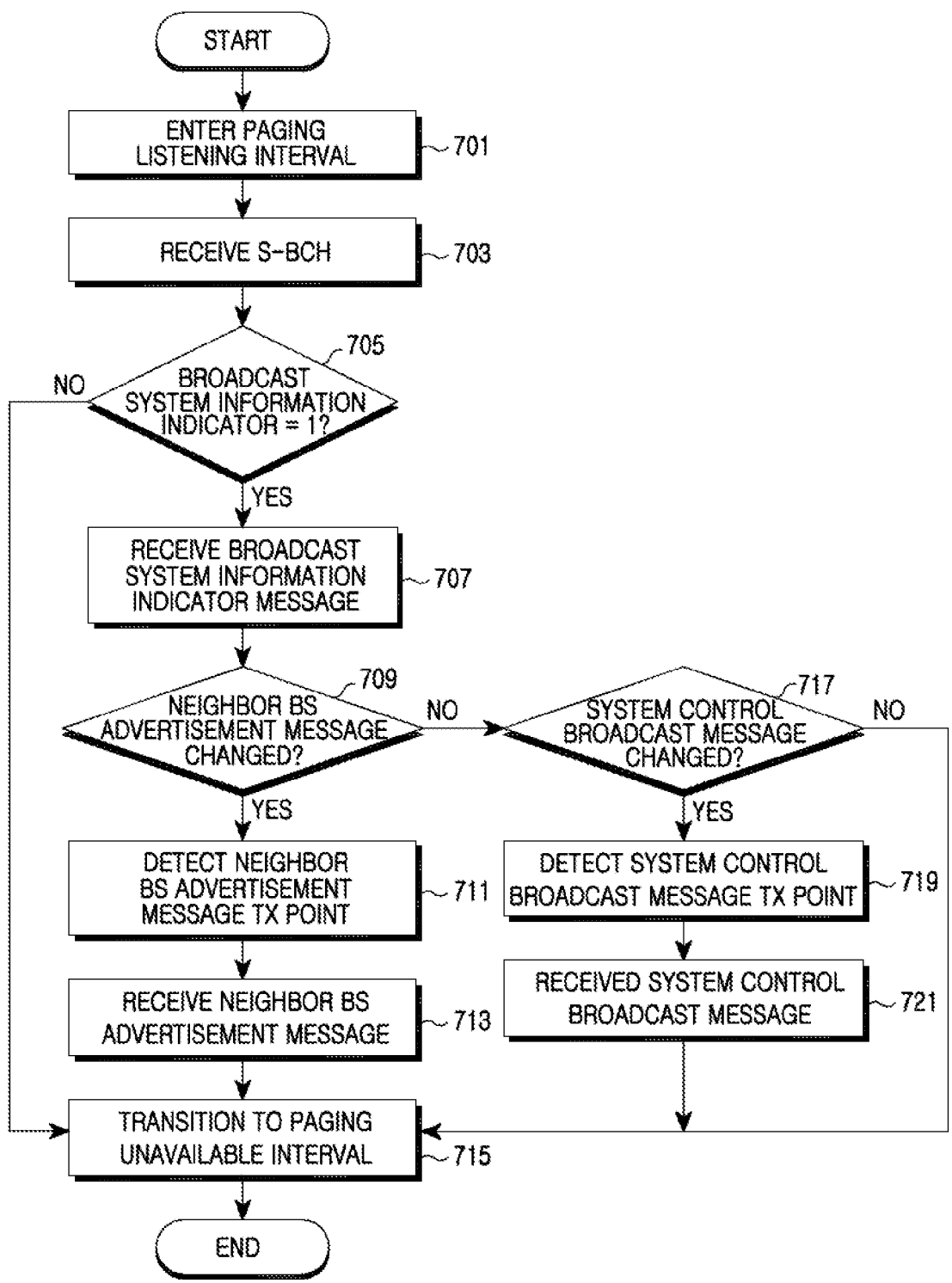
FIG. 7 is a flowchart illustrating an operation of the MS for processing system information and a neighbor BS advertisement message in an idle mode in a wireless communication system according to another exemplary embodiment of the present invention.

FIG. 7 is a flowchart illustrating an operation of the MS for processing system information and a neighbor BS advertisement message in an idle mode in a wireless communication system according to another exemplary embodiment of the present invention.

Referring to FIG. 7, in step 701, the MS in an idle mode enters a paging listening interval. In step 703, the MS receives a superframe header for a P-BCH and an S-BCH transmitted by a BS. The S-BCH includes a broadcast system information indicator indicating whether the BS transmits a broadcast system information indicator message in the paging listening interval.

In step 705, based on the broadcast system information indicator, the MS determines whether the broadcast system information indicator message is transmitted in the paging listening interval. If the broadcast system information indicator message is transmitted (and is '1'), the MS proceeds to step 707. In step 707, the MS receives the broadcast system information indicator message. Herein, the broadcast system information indicator message may have a structure as shown in Table 6.

In step 709, the MS determines whether the CCC value of a neighbor BS advertisement message included in the broadcast system information indicator message is identical to the CCC value of a neighbor BS advertisement message stored in the MS. If they are different, the MS proceeds to step 711. In step 711, the MS detects information about the point of transmission of a neighbor BS advertisement message by the BS, in order to obtain the latest neighbor BS advertisement message information. In step 713, the MS receives the neighbor BS advertisement message at the neighbor BS advertisement message TX point. In step 715, if the neighbor BS advertisement message TX point is in the paging listening interval of the MS, the MS receives the neighbor BS advertisement message and then transitions to a paging unavailable interval. If the neighbor BS advertisement message TX point is in a paging unavailable interval, the MS awakes from the paging unavailable interval to receive the neighbor BS advertisement message. Then, the MS again transitions to the paging unavailable interval.

If the neighbor BS advertisement message is not changed in step 709, the MS proceeds to step 717. In step 717, based on the CCC value of the additional system control broadcast message, the MS determines whether it is different from the additional system control broadcast information stored in the MS. If the additional system control broadcast message is changed, the MS proceeds to step 719. In step 719, the MS detects the TX point of the additional system control broadcast message. In step 721, the MS receives the updated additional system control broadcast message at the additional system control broadcast message TX point. Herein, if the additional system control broadcast message TX point corresponds to the paging listening interval of the MS, the MS receives the additional system control broadcast message and then transitions to a paging unavailable interval in step 715. If the additional system control broadcast message TX point corresponds to the paging unavailable interval of the MS, the MS awakes from the paging unavailable interval at the additional system control broadcast message TX point to receive the additional system control broadcast message. Thereafter, the MS again transitions to the paging unavailable interval.

According to the determinations in steps 709 and 717, if the MS already has a neighbor BS advertisement message and an additional system control broadcast message, the MS transitions to the paging unavailable interval of step 715.

In addition, according to the determination in step 705, if the broadcast system information indicator transmitted in the S-BCH indicates that the broadcast system information indicator message is not transmitted in the paging listening interval, the MS transitions to the paging unavailable interval of step 715 without receiving the broadcast system information indicator message.

Thereafter, the MS ends the processing operation for the system information and the neighbor BS advertisement message.

The broadcast system information indicator message may be transmitted in the subframe corresponding to a superframe header including a P-BCH or an S-BCH in a paging listening interval, in the next subframe, or in the frame including the superframe header. In addition, if the broadcast system information indicator message is transmitted, the TX location of the broadcast system information indicator message is predefined and the MS may receive the broadcast system information indicator message at a predefined location.

Although FIGS. 6 and 7 illustrate that the MS processes the broadcast system information indicator message and then remains in an idle mode, the MS may process the broadcast system information indicator message in order to receive the additional system control broadcast message or the neighbor BS advertisement message, when the MS is a paging target, performs a location update operation, or exists an idle mode.

It has been described that a paging indicator may be used to indicate the existence/nonexistence of a paging message. Hereinafter, a description will be given of another method for using the paging indicator.

If a frame for transmission of a paging message to an MS is predefined in a superframe corresponding to a paging listening interval, the paging indicator may have a format for indicating whether a paging message is transmitted in a corresponding frame. That is, if the paging indicator is constituted by a bitmap of the same length as the number of frames constituting one superframe, each bit of the paging indicator indicates, by a value of '0' or '1', whether a paging message is transmitted in each frame. For example, if the paging indicator has a value of '1010', it indicates that a paging message is transmitted in the first and the third frames of the superframe. In this case, MSs destined to receive a paging message in the first and the third frames receive the paging message in the first and the third frames. MSs destined to receive a paging message in the second and the fourth frames receive transition to a paging unavailable interval, knowing that a paging message is not transmitted in the current paging listening interval.

In addition, in the above example, the MSs destined to receive a paging message in the first and the third frames receives the paging message at a location indicated by a MAP transmitted in the first subframe of the corresponding frame. In the case of the first frame, if the first subframe is used to transmit a superframe header, the MAP is transmitted in the second subframe. The MAP may include information for deciding the paging message and information about the length of the paging message, and may be decoded using an idle mode multicast ID. According to exemplary embodiments of the present invention, the MAP including the TX information of the paging message may be dynamically located at any subframe in the corresponding frame.

If a frame for transmission of a paging message is defined in a superframe, any subframe of the corresponding frame or any subframe of the corresponding superframe may be used to indicate whether a paging message is transmitted. The subframe information may be provided through a paging control information BCH transmitting the paging group ID.

If the start location for transmission of a paging message and MCS information are predefined, the allocation information of a paging message may be used without the MAP. Herein, because the burst size information of the pacing message cannot be predefined, separate burst size information should be notified whenever transmitting the paging message. In addition, fixed resources may be used to notify the burst size information. However, because not only the paging message but also a sleep-mode traffic indicator message, a neighbor BS advertisement message, or a system information message transmitted in other broadcast formats may be transmitted in the corresponding subframe, the MS should be notified of the purpose of a message included in the corresponding burst. Thus, the type information of a message transmitted in the burst should be included in a fixed resource used to notify the burst size information.

The paging indicator may be used in combination with paging group ID information and frame information for transmission of a paging message. As described with reference to Tables 3 to 5, a combination of a paging group ID and a paging indicator may be used to indicate the existence of a paging message for an MS included in one paging group. In addition, a combination of a paging indicator, a paging group ID, and frame information for transmission of a paging message may be transmitted to indicate that the paging message is transmitted for an MS group receiving a paging message in a specific frame of a superframe, among MSs included in a paging group, the structure of which has the form of a combination of a paging group ID and a paging indicator for each frame.

The information of the paging indicator is transmitted through a P-BCH, an S-BCH, or an additional BCH.

A method for determining the transmission/non-transmission of the paging message may also be applied in a system that does not use the paging indicator. When each MS receives a paging message, a frame is predefined and the MS entering a paging listening interval decodes a MAP including the transmission information of the paging message in the first subframe of the corresponding frame allocated to the MS itself. In the case of the first frame, if the first subframe is used to transmit a superframe header, the MAP is transmitted in the second subframe. The MAP is decoded using an idle mode multicast ID. The MS receives the paging message at a location indicated by the MAP. If there is no MAP decoded by an idle mode multicast ID in the first subframe of the corresponding frame, it indicates that a paging message is not transmitted in the frame, and an MS destined to receive a paging message in the frame transitions to a paging unavailable interval.

As described above, exemplary embodiments of the present invention set the paging cycle and the paging offset to the system broadcast information TX cycle in the wireless communication system, thereby making it possible to optimize the wait time of the awoken MS to receive the system broadcast information in the paging listening interval. In addition, the present invention reduces the number of times of MOB_PAG-ADV message transmission, thereby making it possible to reduce the overhead of the MOB_PAG-ADV message. Also, the notification of the existence/nonexistence of the MOB_PAG-ADV message reduces the MOB_PAG-ADV message RX wait time, thereby making it possible to reduce the power consumption of the MS. In addition, exemplary embodiments of the present invention transmit the paging group ID not through the MOB_PAG-ADV message but through the system broadcast information received in the paging listening interval, thereby making it possible to reduce the overhead of the MOB_PAG-ADV message.

While the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the exemplary embodiments of the invention but by the appended claims, and all differences within the scope will be construed as being included in the present invention.

What is claimed is:

1. A method for operating a Mobile Station (MS) to support an idle mode in a superframe-based wireless communication system, the method comprising:
 receiving a first message comprising a paging group Identifier (ID) during a paging listening interval;
 receiving a second message indicating whether to perform one of a location update process and a network entry process;
 if the second message indicates that the MS is a paging target, performing one of the location update process and the network entry process based on information in the second message; and
 returning to a paging unavailable interval if the second message does not indicate that the MS is a paging target.

2. The method of claim 1, wherein the first message includes information indicating whether the second message is transmitted in the paging listening interval.

3. The method of claim 1, further comprising:
 comparing a first paging group ID of a previous paging group and a second paging group ID obtained through the first message; and
 detecting a superframe-based Configuration Change Count (CCC) for Primary Broadcast CHannel (P-BCH) obtained through a Broadcast Channel (BCH), if the first paging group ID is identical to the second paging group ID.

4. The method of claim 3, further comprising:
 obtaining system information used to perform a location update operation, if the first paging group ID is different from the second paging group ID.

5. The method of claim 3, further comprising:
 obtaining system BCH information if the superframe-based CCC for P-BCH obtained through the BCH is different from a stored value.

6. The method of claim 1, further comprising:
 obtaining paging cycle information, paging offset information and paging listening interval information when returning to the paging unavailable interval.

7. The method of claim 6, wherein the paging cycle has a length corresponding to an integer multiple of a superframe-based Primary Broadcast CHannel (P-BCH) information TX interval.

8. The method of claim 6, wherein the paging offset corresponds to the amount of time the MS waits until the starting point of the paging listening interval in the paging cycle, and is set to the starting point of the superframe-based Primary Broadcast CHannel (P-BCH) information TX interval or to 1/n of the superframe-based P-BCH information TX interval.

9. The method of claim 6, wherein the paging listening interval is one or more superframes.

10. The method of claim 1, further comprising:
 determining whether a current paging group is identical to a previous paging group through the first message; and
 performing a location update if the current paging group is not identical to the previous paging group.

11. The method of claim 1, wherein the first message is transmitted in one of a next subframe and a same subframe as a superframe header including a P-BCH.

12. A method for operating a Base Station (BS) to support an idle mode in a superframe-based wireless communication system, the method comprising:
 transmitting a first message comprising a paging group Identifier (ID) in a paging listening interval; and
 transmitting a second message indicating whether to perform one of a location update process and a network entry process in the paging listening interval,
 wherein the first message includes information indicating whether the second message is transmitted in the paging listening interval.

13. The method of claim 12, wherein the first message is transmitted in one of a next subframe and a same subframe as a superframe header including a P-BCH.

14. An apparatus of a Mobile Station (MS) for supporting an idle mode in a superframe-based wireless communication system, the apparatus comprising:
 a paging controller for receiving a first message comprising a paging group Identifier (ID) during the paging listening interval, and for receiving a second message indicating whether to perform one of a location update process and a network entry process; and
 an idle mode controller for, if the second message indicates that the MS is a paging target, performing one of the location update process and the network entry process based on information in the second message, and for returning to a paging unavailable interval if the second message does not indicate that the MS is a paging target.

15. The apparatus of claim 14, wherein the first message includes information indicating whether the second message is transmitted in the paging listening interval.

16. The apparatus of claim 14, wherein the paging controller compares a first paging group ID of the previous paging group and a second paging group ID obtained through the first message and detects a superframe-based Configuration Change Count (CCC) for Primary Broadcast CHannel (P-BCH) obtained through a Broadcast CHannel (BCH), if the first paging group ID is identical to the second paging group ID.

17. The apparatus of claim 16, wherein the paging controller obtains system information used to perform a location update operation, if the first paging group ID is different from the second paging group ID.

18. The apparatus of claim 16, wherein the paging controller obtains system BCH information if the superframe-based CCC for P-BCH obtained through the BCH is different from a stored value.

19. The apparatus of claim 14, wherein the idle mode controller obtains at least one of paging cycle information, paging offset information, and paging listening interval information when returning to the paging unavailable interval.

20. The apparatus of claim 19, wherein the paging cycle has a length corresponding to an integer multiple of a superframe-based Primary Broadcast CHannel (P-BCH) information TX interval.

21. The apparatus of claim 19, wherein the paging offset corresponds to an amount of time of the MS waits until the starting point of the paging listening interval in the paging cycle, and is set to the starting point of the superframe-based Primary Broadcast CHannel (P-BCH) information TX interval or to 1/n of the superframe-based P-BCH information TX interval.

22. The apparatus of claim 19, wherein the paging listening interval is one or more superframes.

23. The apparatus of claim 14, further comprising:
 a paging controller for determining whether current paging group is identical to a previous paging group through the first message, and for performing a location update if the current paging group is not identical to the previous paging group.

24. The apparatus of claim 14, wherein the first message is transmitted in one of a next subframe and a same subframe as a superframe header including a P-BCH.

25. An apparatus of a Base Station (BS) for supporting an idle mode in a superframe-based wireless communication system, the apparatus comprising:
a controller for
transmitting a first message comprising a paging group Identifier (ID) in a paging listening interval; and for
transmitting a second message indicating whether to perform one of a location update process and a network entry process in the paging listening interval.

26. The apparatus of claim 25, wherein the first message includes information indicating whether the second message is transmitted in the paging listening interval.

27. The apparatus of claim 25, wherein the first message is transmitted in one of a next subframe and a same subframe as a superframe header including a P-BCH.

28. A method for operating a Mobile Station (MS) to support an idle mode in a superframe-based wireless communication system, the method comprising:
receiving a first message comprising a paging group Identifier (ID) during a paging listening interval;
receiving a second message including information used to determine whether to perform one of a location update process, a network entry process, and a process of returning to a paging unavailable interval; and
performing one of the location update process, the network entry process, and a process of returning to the paging unavailable interval.

* * * * *